United States Patent
Yang et al.

(10) Patent No.: US 9,323,357 B2
(45) Date of Patent: Apr. 26, 2016

(54) ELECTRONIC DEVICE WITH STYLUS PEN HAVING FM ANTENNA FUNCTIONALITY

(71) Applicant: ScienBiziP Consulting (Shen Zhen) Co., Ltd., Shenzhen (CN)

(72) Inventors: Chih-Yuan Yang, New Taipei (TW); Qing-Liang Guo, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/585,437

(22) Filed: Dec. 30, 2014

(65) Prior Publication Data
US 2015/0185881 A1    Jul. 2, 2015

(30) Foreign Application Priority Data

Dec. 31, 2013    (CN) .......................... 2013 1 0747264

(51) Int. Cl.
| | |
|---|---|
| *H04M 1/00* | (2006.01) |
| *G06F 3/0354* | (2013.01) |
| *H04B 1/08* | (2006.01) |
| *G06F 1/16* | (2006.01) |
| *H04B 1/38* | (2015.01) |

(52) U.S. Cl.
CPC .......... *G06F 3/03545* (2013.01); *G06F 1/1698* (2013.01); *H04B 1/088* (2013.01); *G06F 2200/1632* (2013.01)

(58) Field of Classification Search
CPC ....... G06F 3/0354; H01Q 1/243; H01Q 1/244
USPC ......................................... 455/575.7
See application file for complete search history.

(56) References Cited

U.S. PATENT DOCUMENTS

| | | | | |
|---|---|---|---|---|
| 6,275,193 | B1* | 8/2001 | Nilsen ...................... | H01Q 1/44 343/702 |
| 7,656,355 | B2* | 2/2010 | Hsin ...................... | H01Q 1/084 343/702 |
| 7,843,395 | B2* | 11/2010 | Chen ...................... | G06F 1/1626 343/702 |
| 2006/0055686 | A1* | 3/2006 | Lee ........................ | G06F 1/1626 345/179 |
| 2014/0043283 | A1* | 2/2014 | Kim ....................... | G06F 3/0416 345/174 |
| 2014/0134962 | A1* | 5/2014 | Huynh ................... | H01Q 1/242 455/77 |

* cited by examiner

*Primary Examiner* — Lee Nguyen
(74) *Attorney, Agent, or Firm* — Novak Druce Connolly Bove + Quigg LLP

(57) ABSTRACT

An electronic device and its stylus pen having an FM antenna functionality are provided. The stylus pen includes a pen tip, a penholder, and a metal element spirally surrounding the penholder from a first end portion to a second end portion of the penholder. The pen tip is made of conductive material, the penholder is made of insulated material, and at least one end portion of the metal element is electrically coupled to the pen tip. When the pen tip is inserted into an antenna jack defined in the electronic device, the metal element of the stylus pen is electrically coupled via the pen tip to a radio receiving circuit arranged inside the electronic device. The metal element is thereby enabled to act as an FM antenna and is enabled to receive wireless signals from the radio receiving circuit and transmit wireless signals to the radio receiving circuit.

7 Claims, 3 Drawing Sheets

ELECTRONIC DEVICE WITH STYLUS PEN HAVING FM ANTENNA FUNCTIONALITY

CROSS-REFERENCE TO RELATED APPLICATIONS

This application claims priority to Chinese Patent Application No. 201310747264.9 filed on Dec. 31, 2013, the contents of which are incorporated by reference herein.

FIELD

The subject matter herein generally relates to antenna structures, and particularly to an electronic device with a stylus pen having frequency modulation (FM) antenna functionality.

BACKGROUND

An FM function is usually integrated in an electronic device, such as a mobile phone, and a long FM antenna is better for improvement of reception of the FM function of the electronic device.

BRIEF DESCRIPTION OF THE DRAWINGS

Implementations of the present disclosure will now be described, by way of example only, with reference to the attached figures.

DETAILED DESCRIPTION

Figure 1:
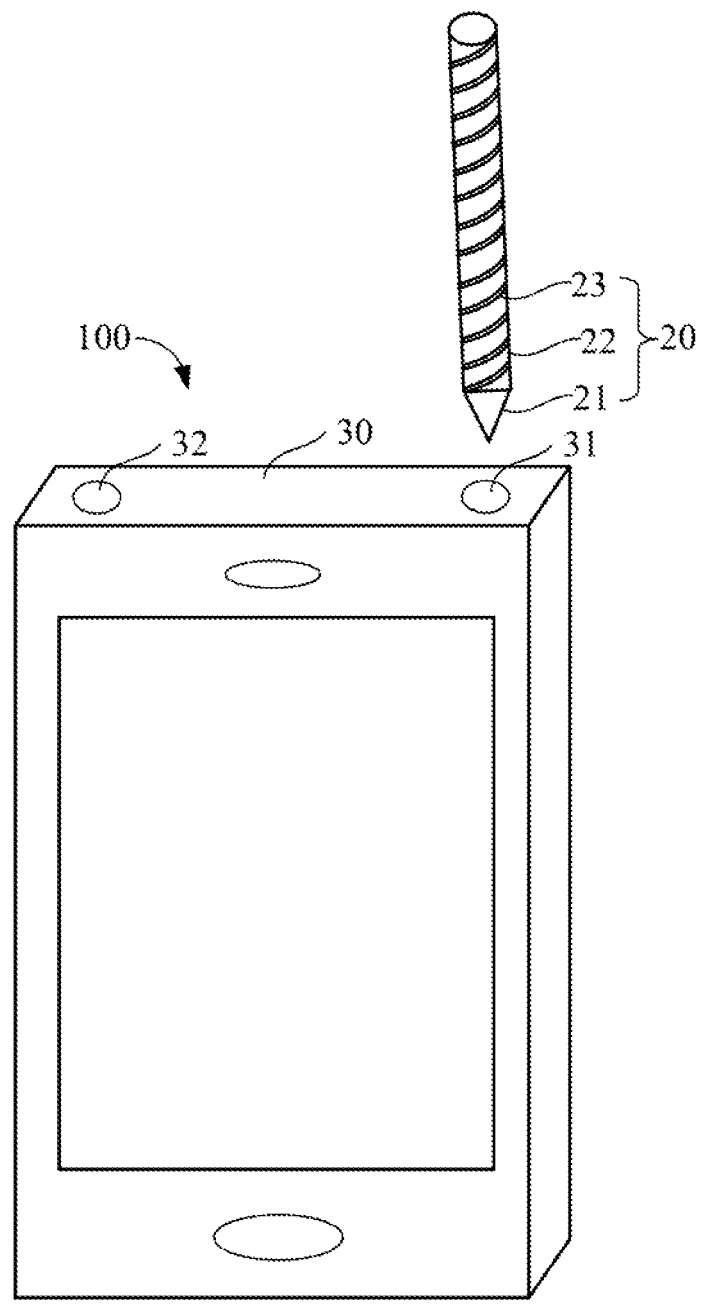
FIG. 1 is an isometric view of an electronic device and its stylus pen having
FM antenna functionality.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "comprising" means "including, but not necessarily limited to"; it specifically indicates open-ended inclusion or membership in a so-described combination, group, series and the like.

FIG. 1 illustrates a stylus pen 20 having frequency modulation FM antenna functionality. The stylus pen 20 includes a pen tip 21, a penholder 22 and a metal element 23. In one embodiment, the pen tip 21 is made of conductive material, and the penholder 22 is made of insulated material.

The metal element 23 includes a first end portion and a second end portion, and the metal element spirally surrounds the penholder 22 from a first end portion to a second end portion of the penholder 22, and at least one of the end portions of the metal element 23 is electrically coupled to the pen tip 21. In a first embodiment, the metal element 23 is wrapped around an outer surface of the penholder 22. In a second embodiment, the metal element 23 is etched on an outer surface of the penholder 22.

Figure 2:
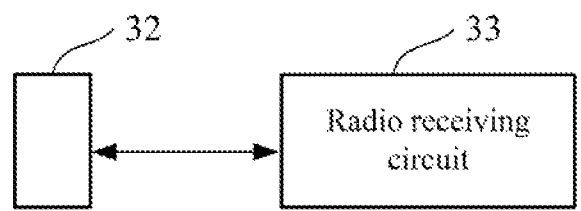
FIG. 2 is a block diagram of the electronic device of FIG. 1 showing connection between an antenna jack and a radio receiving circuit.

The stylus pen 20 can be used as an input device for an electronic device 100. The electronic device 100 includes a body 30, a radio receiving circuit 33 as shown in FIG. 2 and arranged inside the body 30, and a slot 31 and an antenna jack 32 defined in the body 30. The slot 31 is configured to receive the stylus pen 20 when the stylus pen 20 is not in use.

FIG. 2 illustrates in one embodiment, the antenna jack 32 is electrically coupled to the radio receiving circuit 33.

Figure 3:
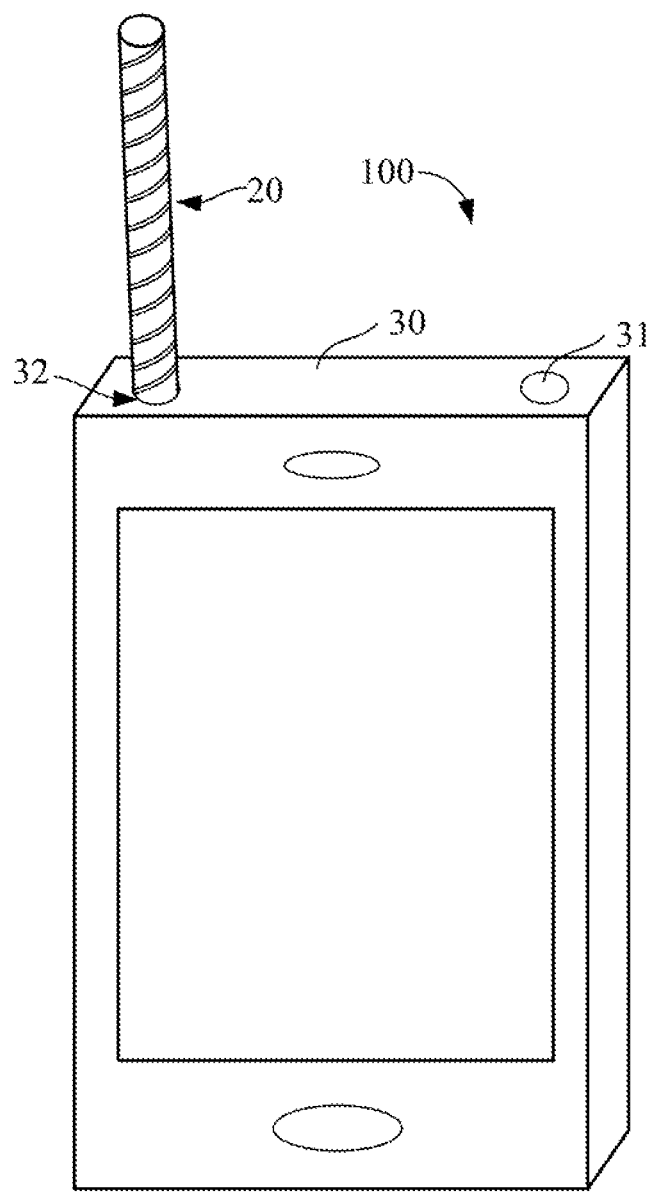
FIG. 3 is an isometric view of the stylus pen of FIG. 1 being used as an FM antenna for the electronic device.

FIG. 3 illustrates in use, when the pen tip 21 of the stylus pen 20 is inserted into an antenna jack 32, the metal element 23 of the stylus pen 20 can be electrically coupled via the pen tip 21 to the radio receiving circuit 33, and the metal element 23 is thereby enabled to act as an FM antenna of the electronic device 100, and is enabled to receive wireless signals from the radio receiving circuit 33 and transmit wireless signals to the radio receiving circuit 33.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in particular the matters of shape, size, and arrangement of parts within the principles of the present disclosure, up to and including the full extent established by the broad general meaning of the terms used in the claims.

What is claimed is:

1. A stylus pen having frequency modulation (FM) antenna functionality, the stylus pen comprising:
  a pen tip and a penholder, wherein the pen tip is made of conductive material, and the penholder is made of insulated material; and
  a metal element having a first end portion and a second end portion, the metal element spirally surrounding the penholder from a first end portion to a second end portion of the penholder, wherein at least one of the end portions of the metal element is electrically coupled to the pen tip;
  wherein when the pen tip of the stylus pen is inserted into an antenna jack defined in an electronic device, the metal element of the stylus pen is electrically coupled via the pen tip to a radio receiving circuit arranged inside the electronic device, and the metal element is thereby enabled to act as an FM antenna of the electronic device, and is enabled to receive wireless signals from the radio receiving circuit and transmit wireless signals to the radio receiving circuit.

2. The stylus pen as described in claim 1, wherein the metal element is wrapped around an outer surface of the penholder.

3. The stylus pen as described in claim 1, wherein the metal element is etched on an outer surface of the penholder.

4. An electronic device comprising:
a body;
a radio receiving circuit arranged inside the body;
an antenna jack defined in the body, wherein the antenna jack is electrically coupled to the radio receiving circuit; and
a stylus pen comprising:
   a pen tip and a penholder, wherein the pen tip is made of conductive material, and the penholder is made of insulated material; and
   a metal element having a first end portion and a second end portion, the metal element spirally surrounding the penholder from a first end portion to a second end portion of the penholder, wherein at least one of the end portions of the metal element is electrically coupled to the pen tip;
wherein when the pen tip of the stylus pen is inserted into the antenna jack, the metal element of the stylus pen is electrically coupled via the pen tip to the radio receiving circuit, and the metal element is thereby enabled to act as an FM antenna of the electronic device, and is enabled to receive wireless signals from the radio receiving circuit and transmit wireless signals to the radio receiving circuit.

5. The electronic device as described in claim 4, wherein the metal element is wrapped around an outer surface of the penholder.

6. The electronic device as described in claim 4, wherein the metal element is etched on an outer surface of the penholder.

7. The electronic device as described in claim 4, wherein the body further defined a slot configured to receive the stylus pen when the stylus is not in use.

* * * * *